United States Patent
Seong et al.

(10) Patent No.: US 8,305,531 B2
(45) Date of Patent: Nov. 6, 2012

(54) LIQUID CRYSTAL DISPLAY PANEL AND A METHOD OF MANUFACTURING THE SAME

(75) Inventors: Dong-Gi Seong, Seongnam-si (KR); Jae-Jin Lyu, Yongin-si (KR); Seung-Beom Park, Seoul (KR); Keun-Chan Oh, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 353 days.

(21) Appl. No.: 12/765,457

(22) Filed: Apr. 22, 2010

(65) Prior Publication Data

US 2011/0032465 A1    Feb. 10, 2011

(30) Foreign Application Priority Data

Aug. 5, 2009 (KR) .................. 10-2009-0071839

(51) Int. Cl.
*G02F 1/1337* (2006.01)
*H01J 9/24* (2006.01)
*C09K 19/54* (2006.01)
*C09K 19/30* (2006.01)

(52) U.S. Cl. .......... 349/127; 349/187; 349/106; 349/41; 349/123; 349/124; 349/125; 445/24; 252/299.01; 252/299.63

(58) Field of Classification Search .................. 349/187, 349/106, 41, 42, 110, 123, 124, 125, 126, 349/127, 134, 135; 445/24; 252/299.01, 252/299.63
See application file for complete search history.

(56) References Cited

U.S. PATENT DOCUMENTS

| | | | |
|---|---|---|---|
| 5,849,216 A | 12/1998 | Illian et al. | |
| 6,540,938 B1 | 4/2003 | Afzali-Arkadani et al. | |
| 2008/0160222 A1 | 7/2008 | Harding et al. | |
| 2010/0053528 A1* | 3/2010 | Li et al. | 349/124 |
| 2010/0103357 A1* | 4/2010 | Kye et al. | 349/123 |
| 2011/0025967 A1* | 2/2011 | Sohn et al. | 349/124 |
| 2011/0032465 A1* | 2/2011 | Seong et al. | 349/127 |

FOREIGN PATENT DOCUMENTS

| | | |
|---|---|---|
| JP | 11-236451 | 8/1999 |
| JP | 2000-347175 | 12/2000 |
| JP | 2005-105229 | 4/2005 |
| JP | 2005-255981 | 9/2005 |
| JP | 2006-098513 | 4/2006 |
| JP | 2006-099039 | 4/2006 |
| JP | 2006-133718 | 5/2006 |
| JP | 2006-220891 | 8/2006 |
| JP | 2006-299100 | 11/2006 |
| KR | 100232405 B1 | 9/1999 |
| KR | 100257894 B1 | 3/2000 |
| KR | 100360488 | 10/2002 |

* cited by examiner

*Primary Examiner* — Brian Healy
(74) *Attorney, Agent, or Firm* — Cantor Colburn LLP (57) ABSTRACT

A black matrix is disposed on a surface of a first base substrate having a switching element, a color filter is disposed on the switching element in a pixel area, a pixel electrode is disposed on the first base substrate having the color filter, and a first alignment layer is disposed on the pixel electrode to form a first substrate. A common electrode layer is disposed on a second base substrate, and a second alignment layer is disposed on the common electrode layer to form a second substrate. A liquid crystal composition including a reactive mesogen (RM) is interposed between opposing surfaces of the first and second substrates. The RM is cured to form a mesogen cured product on the first and second alignment layers. Accordingly, an RM having a planar structure increases curing speed, reduces, manufacturing time, and improves quality of the LCD panel.

20 Claims, 3 Drawing Sheets

LIQUID CRYSTAL DISPLAY PANEL AND A METHOD OF MANUFACTURING THE SAME

This application claims priority to Korean Patent Application No. 2009-0071839, filed on Aug. 5, 2009, and all the benefits accruing therefrom under 35 U.S.C. §119, the contents of which are herein incorporated by reference in their entirety.

BACKGROUND OF THE INVENTION

1. Field of the Invention

The present invention relates to a liquid crystal display ("LCD") panel and a method of manufacturing the LCD panel. More particularly, the present invention relates to an LCD panel having improved productivity and a method of manufacturing the LCD panel.

2. Description of the Related Art

Generally, a liquid crystal display (LCD) device displays images by controlling light transmittance when a voltage is applied. Such LCD devices may include a liquid crystal layer operating by a patterned vertical alignment ("PVA") mode, which is a type of vertical alignment ("VA") mode for the LCD device, in which liquid crystal compositions are arranged and aligned in different directions by a patterned transparent electrode to form a liquid crystal domain, which increases the viewing angle of the LCD device.

Polarized ultraviolet (UV) light is used to irradiate a photocrosslinkable copolymer including a mesogenic group having liquid crystal properties, the mesogenic group being referred as a reactive mesogen ("RM"), to induce anisotropy in the photocrosslinkable copolymer, and heat is applied to the photocrosslinkable copolymer to enhance the anisotropy of an alignment layer to align liquid crystal molecules.

When an RM that is not cured (i.e., where curing is incomplete) and remains in the liquid crystal layer, an afterimage may form in the LCD device from secondary crosslinking, thereby deteriorating display quality. To overcome this, the energy provided to cure the light reactive monomer in a curing process may be increased, or the exposure time (and hence net dose) may be increased. In addition, curing time of the RM may be reduced by use of an RM having a more sensitive light reactive monomer with high light reaction speed for rapid cure.

However, increasing the illumination intensity of a light source provided in the curing process, may lead to increased power consumption and manufacturing costs. Furthermore, the liquid crystal molecules and/or an alignment layer may be damaged, thereby deteriorating display quality. Moreover, when the exposure time is increased, productivity may be deteriorated as time required for the manufacturing process of the LCD device is increased.

BRIEF SUMMARY OF THE INVENTION

In an embodiment, a liquid crystal display (LCD) panel capable of decreasing the process time including cure time, and improving productivity, is disclosed.

In another embodiment, a method for manufacturing the LCD panel is disclosed.

According to an embodiment, in the method of manufacturing an LCD panel, a black matrix is disposed on a surface of a first base substrate having a switching element formed thereon, a color filter is disposed on the switching element in a pixel area, a pixel electrode is disposed on the substrate having the color filter formed thereon, the pixel electrode is electrically connected to the switching element, and a first alignment layer is disposed on the pixel electrode to form a first substrate. Then, a common electrode layer is disposed on a surface of a second base substrate, and a second alignment layer is disposed on a surface of the common electrode layer to form a second substrate. The first and second substrates are disposed such that the surfaces having the first and second alignment layers face each other as opposing surfaces, and a liquid crystal composition including a liquid crystal compound and a reactive mesogen (RM) is interposed between opposing surfaces of the first substrate and the second substrate. The RM is represented by the following Chemical Formula 1. The RM is then cured to form a mesogen cured product on the first alignment layer and the second alignment layer.

$$B_1-Z_1-A-Z_2-B_2 \qquad \text{Chemical Formula 1}$$

In Chemical Formula 1, A is a divalent radical represented by or any combination thereof, each of $Z_1$ and $Z_2$ independently represents a single bond, or any combination thereof, each of $B_1$ and $B_2$ independently represents or any combination thereof, and each occurrence of a hydrogen atom in A is independently replaceable with an alkyl group having 1 to 10 carbon atoms, F, Cl, $OCF_3$, $OCH_3$, or any combination thereof.

In an exemplary embodiment, the liquid crystal composition may include about 0.1 percent by weight to about 1.0 percent by weight of the RM based on a total weight of the liquid crystal composition.

In an exemplary embodiment, the liquid crystal composition may include an initiator.

In an exemplary embodiment, the liquid crystal composition may include about 0.1 percent by weight to about 1.0 percent by weight of the initiator based on the total weight of the RM.

In an exemplary embodiment, the initiator may include at least one selected from the group consisting of compounds represented by the following Chemical Formulas 2, 3, 4, 5, 6, 7, 8, 9, 10, 11, 12, 13, 14, and any combination thereof.

Chemical Formula 2

Chemical Formula 3

Chemical Formula 4

Chemical Formula 5

Chemical Formula 6

Chemical Formula 7

Chemical Formula 8

Chemical Formula 9

In Chemical Formula 9, R represents a hydrogen atom or an alkyl group having 1 to 4 carbon atoms.

Chemical Formula 10

In Chemical Formula 10, R represents a hydrogen atom or an alkyl group having 1 to 4 carbon atoms.

Chemical Formula 11

Chemical Formula 12

Chemical Formula 13

Chemical Formula 14

In an exemplary embodiment, in forming the mesogen cured product, a voltage may be applied between the first substrate and the second substrate, and the first substrate and the second substrate may be irradiated with UV light while the voltage is being applied between the first substrate and the second substrate.

In an exemplary embodiment, in forming the mesogen cured product, the first substrate and the second substrate may be irradiated with UV light while the voltage is not being applied between the first substrate and the second substrate, after previously irradiating the first and second substrate with UV light while the voltage is being applied between the first substrate and the second substrate.

In an exemplary embodiment, the first alignment layer and the second alignment layer may be configured to arrange a long axis of liquid crystal molecules of a liquid crystal layer in parallel with a vertical direction with respect to a surface of the substrate when a voltage is not applied to the liquid crystal layer.

In an exemplary embodiment, the liquid crystal molecules may be pre-tilted by irradiating the liquid crystal molecules with UV light while a voltage is applied to a liquid crystal layer.

In an exemplary embodiment, the pixel electrode may include a microslit pattern, and a common electrode layer may be substantially entirely formed on a surface of the second substrate.

According to another embodiment, an LCD panel includes a first substrate including a black matrix disposed on a surface of a first base substrate having a switching element formed thereon, a color filter disposed on the switching element in a pixel area, a pixel electrode disposed on the substrate having the color filter formed thereon, the pixel electrode being electrically connected to the switching element, and a first alignment layer disposed on the pixel electrode, a second substrate including a common electrode layer disposed on a surface of a second base substrate, and a second alignment layer disposed on the common electrode layer where the first and second substrates are disposed such that the surfaces having the first and second alignment layers face each other as opposing surfaces, and a liquid crystal layer interposed between the opposing surfaces of the first substrate and the second substrate. The liquid crystal layer includes a liquid crystal composition including a liquid crystal compound and an RM represented by the following Chemical Formula 1, and the RM is cured to form a mesogen cured product on the first alignment layer and the second alignment layer, $B_1—Z_1\text{-A-}Z_2—B_2$      Chemical Formula 1

In Chemical Formula 1, A is a divalent radical represented by or any combination thereof, each of $Z_1$ and $Z_2$ independently represents a single bond, or any combination thereof, each of $B_1$ and $B_2$ independently represents or a combination thereof, and each occurrence of a hydrogen atom in A is independently replaceable with an alkyl group having 1 to 10 carbon atoms, F, Cl, $OCF_3$, $OCH_3$, or any combination thereof. Exemplary alkyl groups having 1 to 10 carbon atoms may include, for example, methyl, ethyl, n-propyl, 2-propyl, n-butyl, 2-butyl, 2-methyl-1-propyl, n-pentyl, 2,2-dimethylpropyl, n-hexyl, n-octyl, n-decyl, cyclopentyl, cyclohexyl, and the like.

In an exemplary embodiment, the LCD panel may further include a column spacer. The column spacer may be disposed on the first substrate having a color filter formed thereon to maintain an interval between the first substrate and the second substrate.

In an exemplary embodiment, a liquid crystal composition includes a liquid crystal compound, 0.1 weight percent to 1 weight percent of a reactive mesogen represented by the following Chemical Formula 1, and an initiator, in which the amount of reactive mesogen is based on the total weight of the liquid crystal composition:

$B_1$—$Z_1$-A-$Z_2$—$B_2$  Chemical Formula 1 wherein A is a divalent radical represented by or any combination thereof, each of $Z_1$ and $Z_2$ independently represents a single bond, or any combination thereof, each of $B_1$ and $B_2$ independently represents or any combination thereof, and each occurrence of a hydrogen atom in A is independently replaceable with an alkyl group having 1 to 10 carbon atoms, F, Cl, $OCF_3$, $OCH_3$, or any combination thereof.

According to another embodiment, an RM has a planar structure, so that a free radical is stabilized to increase curing speed of the RM. Thus, manufacturing time may be decreased, thereby improving quality of an LCD panel.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to"

another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to exemplary embodiments shown in the accompanying drawings.

Figure 1:
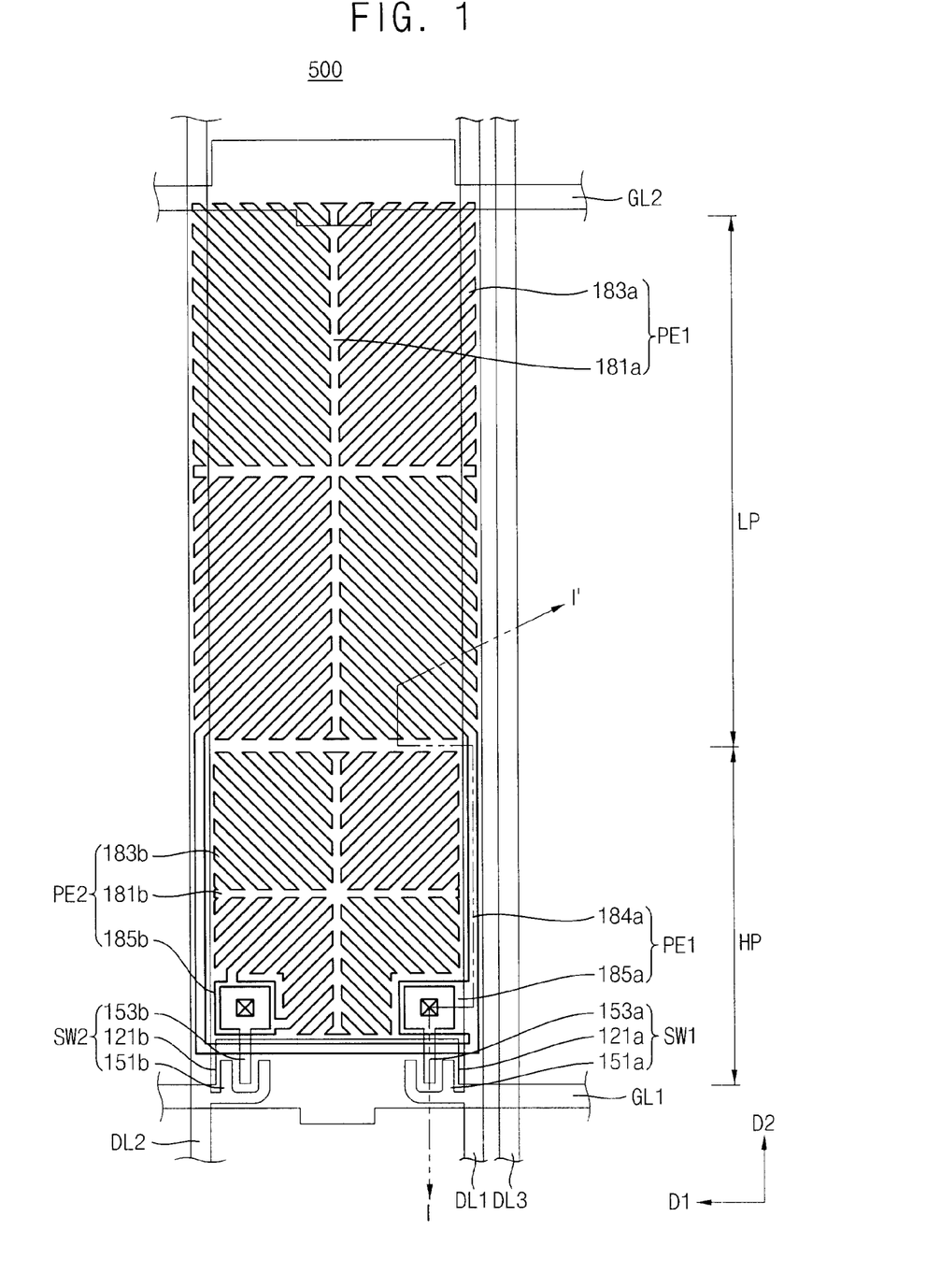
FIG. 1 is a plan view illustrating an exemplary liquid crystal display (LCD) panel according to an embodiment.

FIG. 1 is a plan view illustrating a liquid crystal display (LCD) panel according to an example embodiment of the present invention.

Figure 2:
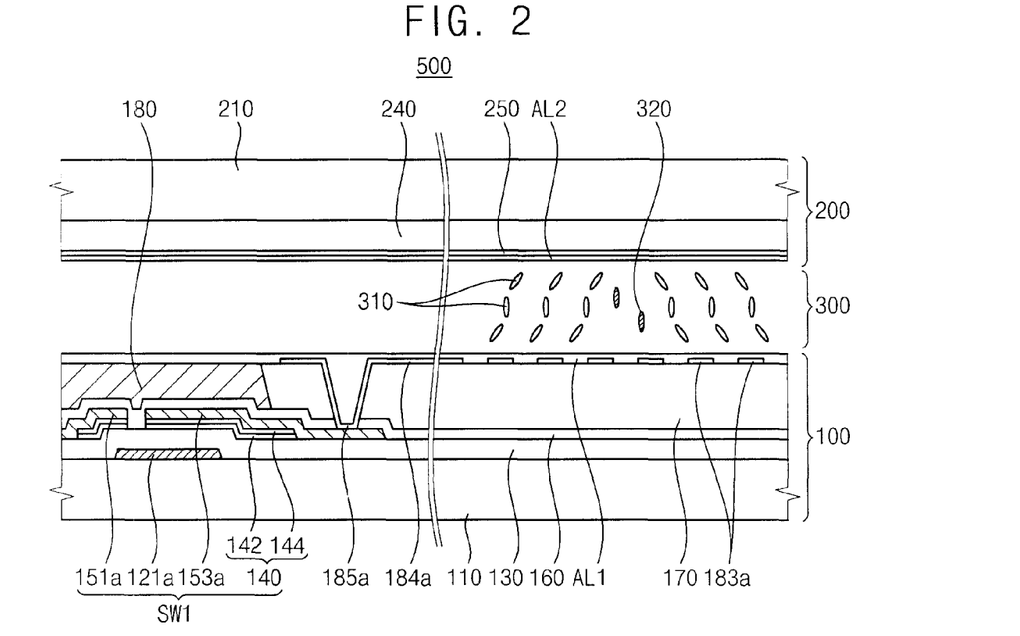
FIG. 2 is a cross-sectional view taken along a line I-I' of the exemplary LCD panel of FIG. 1.

FIG. 2 is a cross-sectional view taken along a line I-I' of the LCD panel of FIG. 1.

Referring to FIGS. 1 and 2, an LCD panel 500 according to an exemplary embodiment includes a first substrate 100, a second substrate 200, and a liquid crystal layer 300 interposed between opposing surfaces of the first substrate 100 and the second substrate 200 (see FIG. 2).

The first substrate 100 includes first and second gate lines GL1 and GL2, first and second data lines DL1 and DL2, first and second switching elements SW1 and SW2, a gate insulating layer 130, an active layer 140, a passivation layer 160, a color filter 170, a black matrix 180, first and second pixel electrodes PE1 and PE2, and a first alignment layer AL1.

The first substrate 100 has a black matrix on array ("BOA") structure including the black matrix and the color filter, which are formed on a surface of an array substrate. Inclusion of the BOA structure may thus obviate that a reactive mesogen (RM) does not react (i.e., cure) in a corresponding area when covered by a metal line or a black matrix when the substrate having the RM thereon is irradiated with UV light. The second substrate 200 includes a transparent common electrode 250 so that an entire surface of a substrate may be exposed to UV light.

The first and second gate lines GL1 and GL2 and the first and second data lines DL1 and DL2 cross each other, i.e. first gate line GL1 and first data line DL1 cross over each other, and second gate line GL2 and second data line DL2 cross over each other, where a region bounded by GL1, GL2, DL1, and DL2 define a pixel area of the first substrate 100. The first and second switching elements SW1 and SW2 and the first and second electrodes PE1 and PE2 are formed on the pixel area. The first and second switching elements SW1 and SW2 serve as switching elements for turning an electrical signal directed to the pixel area on or off, and the first and second electrodes PE1 and PE2 serve as pixel electrodes connected to the switching elements.

The first and second gate lines GL1 and GL2 extend along a first direction D1, and are arranged in parallel in a second direction D2. For example, the first and second directions D1 and D2 may be substantially perpendicular to each other in the plane of the first and second substrates 100 and 200, respectively. The first gate line GL1 is electrically connected to first and second gate electrodes 121a and 121b of the first and second switching elements SW1 and SW2, respectively. A gate signal transmitted from the first gate line GL1 is applied to the first and second gate electrodes 121a and 121b of the first and second switching elements SW1 and SW2, respectively.

The first pixel electrode PE1 is electrically connected to the first switching element SW1. The first pixel electrode PE1 applies a first voltage to the first switching element SW1 through the second data line DL2. The second pixel electrode PE2 is electrically connected to the second switching element SW2. The second pixel electrode PE1 applies a second voltage to the second switching element SW2 through the first data line DL1. An area having the first pixel electrode PE1 may be defined as a low pixel (corresponding to the region LP in FIG. 1) of the LCD panel 500. An area having the second pixel electrode PE2 may be defined as a high pixel (corresponding to the region HP in FIG. 1) of the LCD panel 500.

The first pixel electrode PE1 includes a first microelectrode 183a, a first contact electrode 185a which makes electrical contact with first drain electrode 153a through a contact hole, and a bridge pattern 184a, where it is noted that PE1, though referred to in two separate regions of FIG. 1 for convenient reference, includes in toto these elements as well as first body 181a. The first bridge pattern 184a is formed to surround the second electrode PE2. The first microelectrode 183a may be formed to have a radial shape diverging from a first body 181a having a cross shape and extended in the first and second directions D1 and D2. The second pixel electrode PE2 includes a second microelectrode 183b and a second contact electrode 185b. The second microelectrode 183b may be formed to have a radial shape diverging from a second body 181b having a cross shape.

The first alignment layer AL1 is formed on the first base substrate 110 which includes the first and second electrodes PE1 and PE2. The first alignment layer AL1 may arrange liquid crystal molecules 310 of the liquid crystal layer 300 to be substantially perpendicular to a surface of the first substrate 100. In an exemplary embodiment, the first alignment layer AL1 may include a polyamide compound.

A first mesogen cured product (not shown) may be formed on a surface of the first alignment layer AL1 The first mesogen cured product may induce a pretilt in the liquid crystal molecules 310 to provide a pretilt angle with respect to the vertical direction. An RM 320 is cured by light to form the first mesogen cured product.

The second substrate 200 includes an overcoating layer 240, a common electrode layer 250, and a second alignment layer AL2, which are formed on a surface of the second base substrate 210 facing a surface of the first substrate 100 on which the first alignment layer AL1 is formed. The common electrode layer 250 faces the first and second electrodes PE1 and PE2 and is substantially entirely formed on a surface of the second base substrate 210.

The second alignment layer AL2 may be formed on a surface of the common electrode layer 250, and a second mesogen cured product (not shown) may be formed on a surface of the second alignment layer AL2. The second alignment layer AL2 and the second mesogen cured product is substantially chemically the same as the first alignment layer AL1 and the corresponding first mesogen cured product except that they are formed on the second substrate 200. Accordingly, any further detailed explanation of these layers would be redundant and will therefore be omitted.

The liquid crystal layer 300 includes a liquid crystal composition including the liquid crystal molecules 310 and the RM 320. The liquid crystal molecules 310 may include a conventional liquid crystal compound having conventional properties. For example, the liquid crystal molecules may have negative dielectric anisotropy. The liquid crystal molecules 310 may be aligned such that a long axis of liquid crystal molecules or moieties is substantially parallel with the vertical direction (i.e., perpendicular to the plane of the first and second substrates 100 and 200) with respect to the surface of the first substrate 100 by the first and second alignment layers AL1 and AL2. The liquid crystal molecules 310 may parallel to or may have a pretilt angle with respect to the vertical direction of the first and second mesogen cured products formed on and aligned in a vertical direction (i.e., perpendicular) to a surface of the first and second alignment layers AL1 and AL2.

Hereinafter, referring to FIG. 3, a method of manufacturing the LCD panel described in FIG. 2 will be explained in detail.

Figure 3:
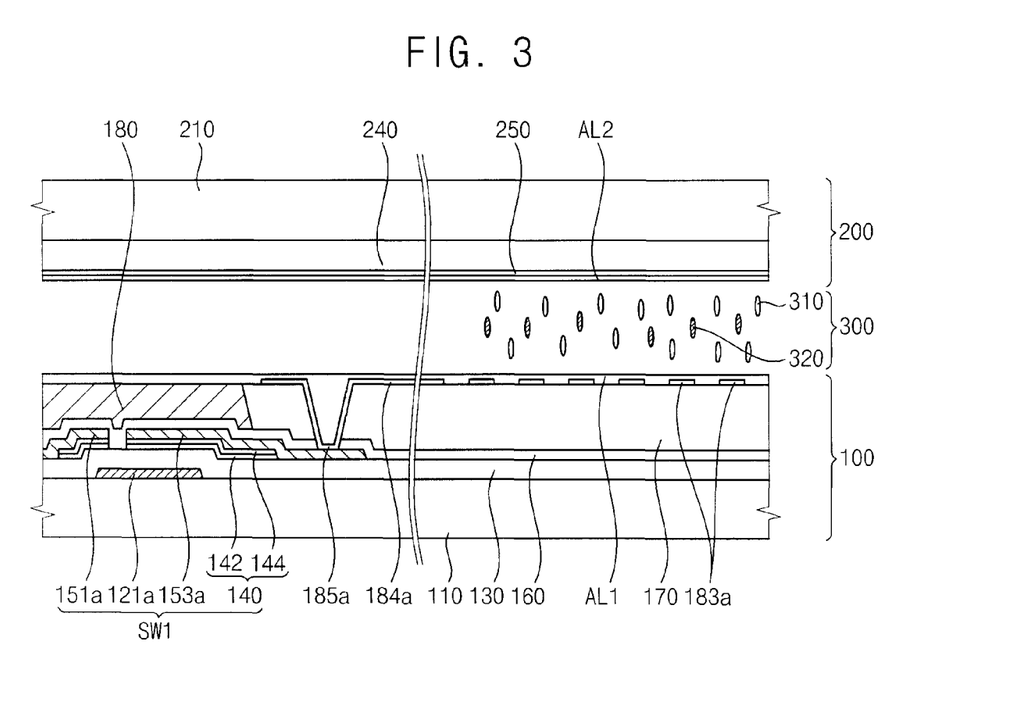
FIG. 3 is a cross-sectional view illustrating an exemplary process for forming the LCD panel of FIG. 2.

FIG. 3 is a cross-sectional view illustrating a process for forming the LCD panel of FIG. 2.

Referring to FIG. 3, a gate pattern is formed on the first base substrate 110. The gate pattern includes the first and second gate lines GL1 and GL2 and the first and second gate electrodes 121a and 121b. The first and second gate electrodes 121a and 121b are formed from a metal layer that is common to or substantially the same as that from which the first and second gate lines GL1 and GL2 are formed, and are extended from the first and second gate lines GL1 and GL2. Examples of a material that may be used for the first and second gate lines GL1 and GL2 may include chromium, aluminum, tantalum, molybdenum, titanium, tungsten, copper, silver, an alloy thereof, and the like, or any combination thereof. The first and second gate lines GL1 and GL2 may include a bilayer or a trilayer structure, with each layer having different physical properties such as, for example, adhesion, conductivity, barrier properties, or the like.

The gate insulation layer 130 is formed on the surface of the first base substrate 110 on which the gate pattern is formed. Examples of a material that may be used for the gate insulation layer 130 may include silicon nitride (SiNx) or silicon oxide (SiOx). An active layer 140 is formed on the gate insulation layer 130, and is an electric guide pathway of the switching element TFT. The active layer 140 includes a semiconductor layer 142 formed of amorphous silicon (a-Si:H) on a surface of the gate insulation layer 130, and an ohmic contact layer 144 disposed on a surface of the semiconductor layer 142. The ohmic contact layer 144 is formed of amorphous silicon doped with impurities (n+a-Si:H).

A source pattern is formed on the gate insulation layer 130 on the surface of the first base substrate 110 on which the active layer 140 is formed, and overlapping with the active layer 140. The source pattern includes the first and second data lines DL1 and DL2, the first and second source electrodes 151a and 151b and the first and second drain electrodes 153a and 153b. The passivation layer 160 is sequentially formed on the gate insulation layer 130 and the source pattern on the surface of the first base substrate 110 on which the source pattern is formed.

The color filter 170 and the black matrix 180 are each formed on a surface of the passivation layer 160 and are located in regions adjacent to one another as shown in the cross-sectional view of FIG. 3.

The color filter 170 may be formed on the pixel area defined by the first and second gate lines GL1 and GL2 and the first and second data lines DL1 and DL2. The color filter 170 may include a first color filter, a second color filter, and a third color filter (not shown). The first, second, and third color filters each represent different colors, respectively. For example, the first color filter may have a red color, the second color filter may have a blue color, and the third color filter may have a green color.

The black matrix 180 may be formed on an area of the surface of the first base substrate 110, which overlaps with the first and second gate lines GL1 and GL2, the first and the second data lines DL1 and DL2, and the first and second switching elements SW1 and SW2 (see FIG. 1). In addition, the black matrix 180 may be formed on an outline area of the first base substrate 110 according to the first data line DL1 and a third data line DL3. The black matrix 180 prevents light passing through the first substrate 101 from entering the liquid crystal layer 300.

The first and second pixel electrodes PE1 and PE2 are formed on the first base substrate 110 on which the color filter 170 and the black matrix 180 are formed. The first and second pixel electrodes PE1 and PE2 are formed on the pixel area. Examples of a material that may be used for the first and second pixel electrodes PE1 and PE2 may include a transparent conductive material such as for example indium tin oxide (ITO), indium zinc oxide (IZO), and the like. The first and second pixel electrodes PE1 and PE2 make contact with the drain electrode through a contact hole, which is exemplified in FIG. 3 where first pixel electrode 185a is in electrical contact with first drain electrode 153a via a contact hole through color filter 170.

The first alignment layer AL1 is formed on the first base substrate 110 on the surface on which (as shown in FIG. 3) the black matrix 180, color filter 170, and first and second pixel electrodes PE1 and PE2 are formed. The first alignment layer AL1 may thus be formed entirely on a surface of the first base substrate 110.

The overcoating layer 240 is formed on a surface of the second base substrate 210, and the common electrode 250 is formed on the second base substrate 210 on which the overcoating layer 240 is formed. The common electrode layer 250 may be formed on an entire surface of the second base substrate 210 without a patterning process.

Thereafter, the second alignment layer AL2 is formed on the second base substrate 210 on which the common electrode layer 250 is formed. The second alignment layer AL2 may be formed the entire surface of the second base substrate 210.

The first and second alignment layers AL1 and AL2 are arranged to face each other by combining the first substrate 100, on which the first alignment layer AL1 is formed, and the second substrate 200, on which the second alignment layer AL2 is formed. Liquid crystal composition is interposed between the opposing surfaces of first and second substrates 100 and 200. The liquid crystal composition may be loaded on the first substrate 100, and the first substrate 100 and the second substrate 200 may be combined so that the liquid crystal composition may be interposed between the opposing surfaces of first and second substrates 100 and 200.

The liquid crystal composition includes the conventional liquid crystal molecules 310 and the RM 320. The RM 320 may be a compound represented by the following Chemical Formula 1.

$$B_1-Z_1-A-Z_2-B_2 \qquad \text{Chemical Formula 1}$$

In Chemical Formula 1, A is a divalent radical represented by

-continued or any combination thereof, each of $Z_1$ and $Z_2$ independently represents a single bond, or any combination thereof, each of $B_1$ and $B_2$ independently represents or a combination thereof, and each hydrogen atom of A is independently replaceable with an alkyl group having 1 to 10 carbon atoms, F, Cl, $OCF_3$, $OCH_3$, or any combination thereof. It will be further understood herein that the cyclic substructures for A, which are each divalent radicals, may be linked to $Z_1$ and $Z_2$ by connecting to any two points on the ring(s) of cyclic substructures A, thus replacing any implied hydrogen atom on these substructures A.

A photopolymerization reaction of the RM is induced by a free radical reaction of an acrylate group or a methacrylate group (as defined herein for $B_1$ and $B_2$ of Formula 1) of the RM. The free radical of the RM is preferably stabilized by pi-conjugation through aromatic moieties of $Z_1$ and $Z_2$ to the core A of the RM so that the photopolymerization reaction may be selectively promoted. When a core of the RM has a planar structure (i.e., as provided by a flat, pi-conjugated cyclic aromatic group A, including polycyclic aromatics including phenylene and fused polycyclic aromatics), adjacent reactive mesogens may be easily deposited on each other by a pi-stacking orientation of the RM. Accordingly, a pi-pi interaction between phenyl rings of the RM increase a resonance, so that the free radical of the RM is stabilized. Thus, when the core of the RM has a planar structure, the lifetime of a free radical generated in the extended pi system is increased. Therefore, more RMs may react at an identical energy.

The content of the RM 320 in the liquid crystal layer 300 may be about 0.1 percent by weight to about 1.0 percent by weight, specifically about 0.2 percent by weight to about 0.9 percent by weight, and more specifically about 0.2 percent by weight to about 0.8 percent by weight, based on a total weight of the liquid crystal composition. When the content of the RM 320 is less than about 0.1% by weight, an RM layer may not be formed adjacent to an alignment layer of an LCD panel. When the content of the RM 320 is greater than about 1.0% by weight, the RM 320 may not react completely and can be secondarily cured by light emanating from a backlight assembly (not shown) which is disposed below the LCD panel 500, or by any externally provided light, to induce an afterimage. Accordingly, it is preferable that the content of the RM 320 in the liquid crystal composition is about 0.1 percent by weight to about 1.0 percent by weight.

The liquid crystal composition may further include an initiator.

The initiator is used to promote a curing reaction of the RM. In an embodiment, the initiator of the present invention absorbs UV light having a long wavelength, in particular from about 300 nm and about 400 nm, to generate a free radical so that photopolymerization reaction is promoted. When the liquid crystal composition includes an initiator, a photopolymerization reaction may be promoted by exposure of the liquid crystal composition to UV light having a long wavelength range. Thus, a UV light having a short wavelength range, which may cause damage to other organic materials, may not be used.

Examples of a material that may be used for the initiator may include compounds represented by the following Chemical Formulas 2 to 14. However, the initiator should not be construed as limited to the examples set forth herein.

Chemical Formula 2

Chemical Formula 3

Chemical Formula 4

Chemical Formula 5

Chemical Formula 6

Chemical Formula 7

Chemical Formula 8

Chemical Formula 9

In Chemical Formula 9, R represents a hydrogen atom or an alkyl group having 1 to 4 carbon atoms.

Chemical Formula 10

In Chemical Formula 10, R represents a hydrogen atom or an alkyl group having 1 to 4 carbon atoms.

Chemical Formula 11

-continued

Chemical Formula 12

Chemical Formula 13

Chemical Formula 14

It will be understood herein, for each of the formulas 2-14, that an unassigned terminal bond represents a terminal methyl (—$CH_3$) group. Exemplary alkyl groups having 1 to 4 carbon atoms include methyl, ethyl, n-propyl, 2-propyl, n-butyl, 2-butyl, 2-methyl-1-propyl, 2-methyl-2-propyl, and the like.

The content of the initiator may be about 0.1% by weight to about 1% by weight, specifically about 0.2% by weight to about 0.8% by weight, and more specifically about 0.3% by weight to about 0.7% by weight, based on the total weight of the RM. In an exemplary embodiment, the content of the initiator may be about 0.5% by weight based on the total weight of the RM. When the content of the initiator is less than about 0.1% by weight, the reactivity of the initiator, as measured by the formation of cured RM material, becomes insignificant. When the content of the initiator is greater than about 1.0% by weight, the initiator functions as an impurity which can cause formation of afterimages.

Examples of materials that may be used for the liquid crystal molecules 310 include compounds represented by the following Chemical Formulas 15 to 20. However, the liquid crystal molecules should not be construed as limited to the examples set forth herein.

Chemical Formula 15

Chemical Formula 16

Chemical Formula 17

In Chemical Formulas 15 to 17, $R_1$, $R_2$, $R_3$, $R_4$, $R_5$ and $R_6$ each independently represent an alkyl-containing group of 1 to 12 carbon atoms. Exemplary alkyl-containing groups may include, for example, methyl, ethyl, n-propyl, 2-propyl, n-butyl, 2-butyl, 2-methyl-1-propyl, n-pentyl, 2,2-dimethylpropyl, n-hexyl, n-octyl, n-decyl, n-dodecyl, cyclopentyl, cyclohexyl, and the like. Where the alkyl-containing group contains a methylene moiety, such as for example in unbranched n-alkyl groups, one or more methylene groups (—$CH_2$—) of $R_1$ to $R_6$ may be independently replaced with —O—, —CH=CH—, —CO—, —OCO—, —COO—, or any combination thereof. For example, $R_1$ to $R_6$ may also include groups such as methoxy, ethoxy, butoxy, hexyloxy, octyloxy, vinyl, 2-propenyl, 2-butenyl, 5-hexenyl, 7-octenyl, acetyl, cyclohexylcarbonyl, acetate, propionate, cyclohexylcarboxylate, octanoate, dodecanoate, and the like, or any combination thereof.

Chemical Formula 18

Chemical Formula 19

Chemical Formula 20

In Chemical Formula 18 to 20, $R_7$, $R_8$, $R_9$, $R_{10}$, $R_{11}$ and $R_{12}$ each independently represent an alkyl-containing group of 1 to 12 carbon atoms. Exemplary alkyl-containing groups may include, for example, methyl, ethyl, n-propyl, 2-propyl, n-butyl, 2-butyl, 2-methyl-1-propyl, n-pentyl, 2,2-dimethylpropyl, n-hexyl, n-octyl, n-decyl, n-dodecyl, cyclopentyl, cyclohexyl, and the like. Where the alkyl-containing group contains a methylene moiety, such as for example in unbranched n-alkyl groups, one or more methylene groups (—$CH_2$—) of $R_7$ to $R_{12}$ may be independently replaced with —O—, —CH=CH—, —CO—, —OCO—, —COO—, or any combination thereof. For example, $R_7$ to $R_{12}$ may also include groups such as methoxy, ethoxy, butoxy, hexyloxy, octyloxy, vinyl, 2-propenyl, 2-butenyl, 5-hexenyl, 7-octenyl, acetyl, cyclohexylcarbonyl, acetate, propionate, cyclohexylcarboxylate, octanoate, dodecanoate, and the like, or any combination thereof.

After disposing the liquid crystal composition to form a liquid crystal layer 300 between opposing faces of first and second substrates 100 and 200, a voltage is applied between the first and second substrates 100 and 200 to form an electric field, so that the liquid crystal molecules 310 and the reactive mesogens 320 are tilted. While the voltage is applied, the first and second substrates 100 and 200 are irradiated with light. For example, the light may be UV light. In a specific embodiment, the wavelength of light is from 300 to 400 nm The reactive mesogens 320 are polymerized by the light and are thereby cured. During the irradiating process, as the electric field is formed between the first and second substrates 100 and 200, the liquid crystal molecules 310 may maintain a tilted state.

After irradiating the first and second substrates 100 and 200 with UV light during which a voltage is applied between the first and second substrates 100 and 200, the first and second substrates 100 and 200 may be further irradiated with UV light where voltage is not being applied across the first and second substrates 100 and 200. Upon further irradiating with UV light where voltage is not being applied, any unreacted RM may be decomposed or reacted, so that the content of reactive RM remaining after curing may be reduced. This further irradiation may prevent formation of any latent afterimages during use of a device such as an LCD prepared by the method.

By irradiating with UV light, the first mesogen cured product is thus formed on the first substrate 100, and the second mesogen cured product is thus formed on the second substrate 200. Specifically, the first mesogen cured product forms on the first alignment layer ALL and the second mesogen cured product forms on the second alignment layer AL2. The first and second mesogen cured products may tilt the liquid crystal molecules 310. In this way, although the electric field is not formed between the first and second substrates 100 and 200, the liquid crystal molecules 310 adjacent to the first and second mesogen cured products may be maintained in a tilted orientation.

According to an embodiment, the RM has a planar structure, so that a free radical generated in the RM is stabilized to increase the curing speed and selectivity of the RM. Thus, manufacturing time may be decreased, and quality of the LCD panel 500 may be improved.

Figure 4:
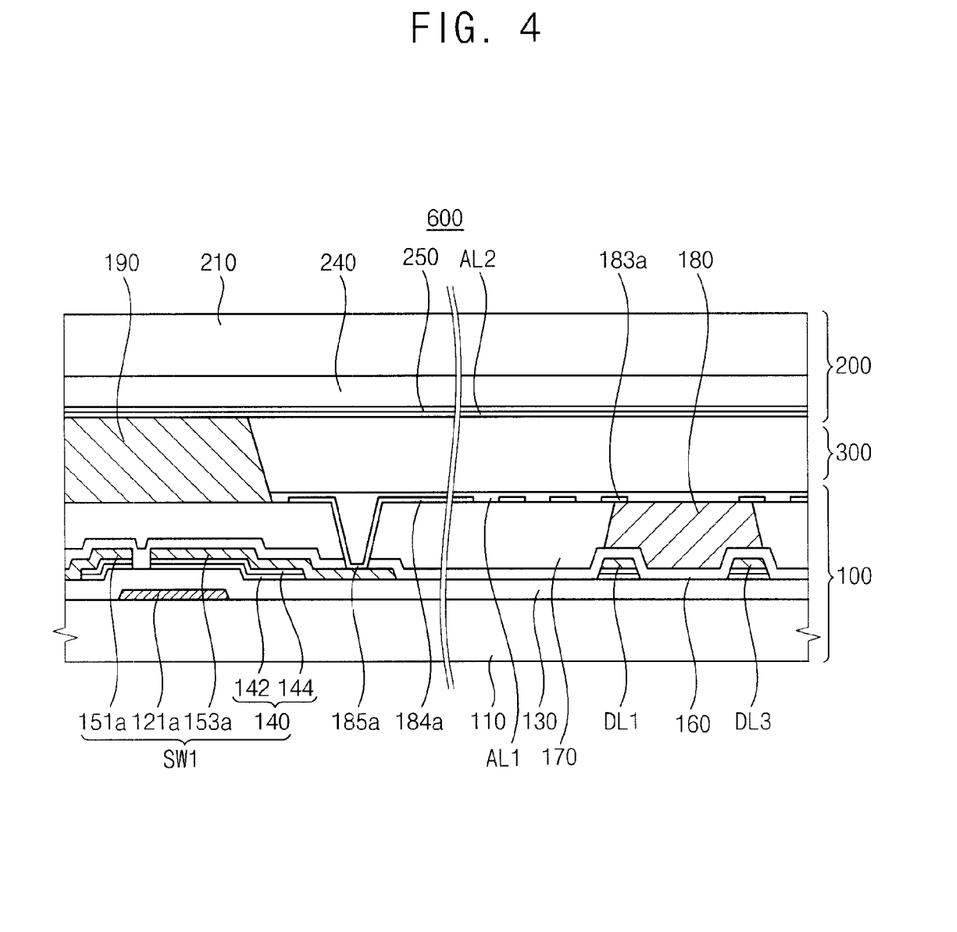
FIG. 4 is a cross-sectional view illustrating an exemplary LCD panel according to another embodiment.

FIG. 4 is a cross-sectional view illustrating an LCD panel 600 according to another exemplary embodiment.

Referring to FIG. 4, the LCD panel 600 includes a first substrate 100, a second substrate 200, and a liquid crystal layer 300 interposed between opposing surfaces of the first substrate 100 and the second substrate 200.

The LCD panel 600 is substantially identical to the LCD panel 500 described in FIG. 2 according to the previous embodiment except for further including a column spacer 190. Accordingly, any detailed explanation will be omitted.

The column spacer 190 is disposed on the color filter 170, and maintains a fixed interval between the first substrate 100 and the second substrate 200. For example, the column spacer 190 may be formed on the color filter 170 of the first base substrate 110 having $n^{th}$ gate line formed thereon. Alternatively, the column spacer 190 may be formed on an area of the first base substrate 110 to overlap with a gate metal pattern and a source metal pattern. The column spacer 190 may be formed of a material identical to the black matrix 180.

The first and second pixel electrodes PE1 and PE2 are formed on the first base substrate 110 on which the color filter 170, the black matrix 180, and the column spacer 190 are formed. The first alignment layer AL1 is formed on the first base substrate 110 on which the first and second electrodes PE1 and PE2 are formed. The second alignment layer AL2 and the common electrode layer 250 are formed on the second base substrate 210.

Thus, an RM included in a liquid crystal display has a planar structure, so that a free radical generated in the RM is stabilized to increase curing speed and curing selectivity of the RM. In this way, manufacturing time may be decreased, and quality of an LCD panel may be improved.

The foregoing is illustrative of the present invention and is not to be construed as limiting thereof. Although a few exemplary embodiments have been described, those skilled in the art will readily appreciate that many modifications are possible in the example embodiments without materially departing from the novel teachings and advantages disclosed herein. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A method of manufacturing a liquid crystal display panel comprising:

forming a first substrate comprising a black matrix disposed on a surface of a first base substrate having a switching element formed thereon, a color filter disposed on the switching element in a pixel area, a pixel electrode disposed on the substrate having the color filter formed thereon, the pixel electrode being electrically connected to the switching element, and a first alignment layer disposed on the pixel electrode;

forming a second substrate comprising a common electrode layer disposed on a surface of a second base substrate, and a second alignment layer disposed on a surface of the common electrode layer, where the first and second substrates are disposed such that the surfaces having the first and second alignment layers face each other as opposing surfaces;

interposing a liquid crystal composition between the first substrate and the second substrate, the liquid crystal composition comprising a liquid crystal compound and a reactive mesogen represented by the following Chemical Formula 1; and curing the reactive mesogen to form a liquid crystal layer comprising a mesogen cured product on the first alignment layer and the second alignment layer, $$B_1—Z_1-A-Z_2—B_2 \quad \text{Chemical Formula 1}$$

wherein A is a divalent radical represented by

-continued or any combination thereof, each of $Z_1$ and $Z_2$ independently represents a single bond, or any combination thereof, each of $B_1$ and $B_2$ independently represents or any combination thereof, and each occurrence of a hydrogen atom in A is independently replaceable with an alkyl group having 1 to 10 carbon atoms, F, Cl, $OCF_3$, $OCH_3$, or any combination thereof.

2. The method of claim 1, wherein the liquid crystal composition comprises about 0.1 percent by weight to about 1.0 percent by weight of the reactive mesogen based on the total weight of the liquid crystal composition.

3. The method of claim 2, wherein the liquid crystal composition further comprises an initiator.

4. The method of claim 3, wherein the liquid crystal composition comprises about 0.1 percent by weight to about 1.0 percent by weight of the initiator based on the total weight of the reactive mesogen.

5. The method of claim 3, wherein the initiator comprises at least one selected from the group consisting of compounds represented by the following Chemical Formulas 2, 3, 4, 5, 6, 7, 8, 9, 10, 11, 12, 13, 14, and any combination thereof:

Chemical Formula 2

Chemical Formula 3

Chemical Formula 4

Chemical Formula 5

Chemical Formula 6

Chemical Formula 7

Chemical Formula 8

Chemical Formula 9

-continued

Chemical Formula 10

Chemical Formula 11

Chemical Formula 12

Chemical Formula 13

Chemical Formula 14 wherein, R represents a hydrogen atom or an alkyl group having 1 to 4 carbon atoms.

6. The method of claim 1, wherein forming the mesogen cured product comprises:
applying a voltage between the first substrate and the second substrate; and
irradiating the first substrate and the second substrate with UV light while the voltage is being applied between the first substrate and the second substrate.

7. The method of claim 6, wherein forming the mesogen cured product further comprises irradiating the first substrate and the second substrate with UV light while the voltage is not being applied between the first substrate and the second substrate, after irradiating the first substrate and the second substrate with UV light while the voltage is being applied between the first substrate and the second substrate.

8. The method of claim 1, wherein the first alignment layer and the second alignment layer are configured to arrange a long axis of liquid crystal molecules of the liquid crystal layer in parallel with a vertical direction with respect to a surface of the substrate when a voltage is not applied to the liquid crystal layer.

9. The method of claim 1, wherein liquid crystal molecules of the liquid crystal compound are pre-tilted by irradiating the liquid crystal molecules with UV light while a voltage is applied to a liquid crystal layer.

10. The method of claim 1, wherein the pixel electrode comprises a microslit pattern and the common electrode layer is substantially entirely formed on a surface of the second substrate.

11. An LCD panel comprising:
a first substrate comprising a black matrix disposed on a surface of a first base substrate having a switching element formed thereon, a color filter disposed on the switching element in a pixel area, a pixel electrode disposed on a surface of the first base substrate having the color filter formed thereon, the pixel electrode being electrically connected to the switching element, and a first alignment layer disposed on the pixel electrode;
a second substrate comprising a common electrode layer disposed on a surface of a second base substrate, and a second alignment layer disposed on a surface of the common electrode layer where the first and second substrates are disposed such that the surfaces having the first and second alignment layers face each other as opposing surfaces;
a liquid crystal layer interposed between opposing surfaces of the first substrate and the second substrate, the liquid crystal layer comprising a liquid crystal composition comprising a liquid crystal compound and a reactive mesogen represented by the following Chemical Formula 1, wherein the reactive mesogen is cured to form a mesogen cured product on the first alignment layer and the second alignment layer, $$B_1-Z_1-A-Z_2-B_2$$  Chemical Formula 1 wherein A is a divalent radical represented by

-continued or any combination thereof, each of $Z_1$ and $Z_2$ independently represents a single bond, or any combination thereof, each of $B_1$ and $B_2$ independently represents or a combination thereof, and each occurrence of a hydrogen atom in A is independently replaceable with an alkyl group having 1 to 10 carbon atoms, F, Cl, $OCF_3$, $OCH_3$, or any combination thereof.

12. The LCD panel of claim 11, wherein the liquid crystal composition comprises about 0.1 percent by weight to about 1.0 percent by weight of the reactive mesogen based on the total weight of the liquid crystal composition.

13. The LCD panel of claim 12, wherein the liquid crystal composition further comprises an initiator.

14. The LCD panel of claim 13, wherein the liquid crystal composition comprises about 0.1 percent by weight to about 1.0 percent by weight of the initiator based on a total weight of the reactive mesogen.

15. The LCD panel of claim 13, wherein the initiator comprises at least one selected from the group consisting of compounds represented by the following Chemical Formulas 2, 3, 4, 5, 6, 7, 8, 9, 10, 11, 12, 13, 14, and any combination thereof:

Chemical Formula 2

-continued

Chemical Formula 3

Chemical Formula 4

Chemical Formula 5

Chemical Formula 6

Chemical Formula 7

Chemical Formula 8

Chemical Formula 9

Chemical Formula 10

US 8,305,531 B2

27 28

-continued wherein A is a divalent radical represented by

Chemical Formula 11

Chemical Formula 12

Chemical Formula 13

Chemical Formula 14 or any combination thereof, each of $Z_1$ and $Z_2$ independently represents a single bond, or any combination thereof, each of $B_1$ and $B_2$ independently represents or any combination thereof, and each occurrence of a hydrogen atom in A is independently replaceable with an alkyl group having 1 to 10 carbon atoms, F, Cl, $OCF_3$, $OCH_3$, or any combination thereof.

19. The liquid crystal composition of claim 18, wherein the liquid crystal compound comprises a liquid crystal compound of Chemical Formulas 15, 16, 17, 18, 19, 20, or any combination thereof:

wherein, R represents a hydrogen atom or an alkyl group having 1 to 4 carbon atoms.

16. The LCD panel of claim 11, further comprising a column spacer disposed on the first substrate having a color filter formed thereon to maintain an interval between the first substrate and the second substrate.

17. The LCD panel of claim 16, wherein the column spacer is formed of a material identical to the black matrix.

18. A liquid crystal composition comprising:
a liquid crystal compound,
0.1 weight percent to 1 weight percent of a reactive mesogen represented by the following Chemical Formula 1, and
an initiator,
wherein the amount of reactive mesogen is based on the total weight of the liquid crystal composition:

$B_1$—$Z_1$-A-$Z_2$—$B_2$    Chemical Formula 1

Chemical Formula 15

Chemical Formula 16

Chemical Formula 17

Chemical Formula 18

Chemical Formula 19

Chemical Formula 20 wherein in Chemical Formulas 15 to 20, $R_1$, $R_2$, $R_3$, $R_4$, $R_5$, $R_6$, $R_7$, $R_8$, $R_9$, $R_{10}$, $R_{11}$ and $R_{12}$ each independently represent an alkyl-containing group of 1 to 12 carbon atoms.

20. A cure product of the liquid crystal composition of claim 18.

* * * * *